(12) United States Patent
Khosrowpour et al.

(10) Patent No.: US 12,405,808 B2
(45) Date of Patent: Sep. 2, 2025

(54) SYSTEM AND METHOD FOR DYNAMICALLY CONFIGURING AN INFORMATION HANDLING SYSTEM BASED ON A PROFILE

(71) Applicant: Dell Products L.P., Round Rock, TX (US)

(72) Inventors: Farzad Khosrowpour, Pflugerville, TX (US); Wen-Hao Zeng, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 18/337,659

(22) Filed: Jun. 20, 2023

(65) Prior Publication Data
US 2024/0427612 A1    Dec. 26, 2024

(51) Int. Cl.
*G06F 9/445* (2018.01)
(52) U.S. Cl.
CPC ............................. *G06F 9/44505* (2013.01)

(58) Field of Classification Search
CPC .................................................. G06F 9/44505
See application file for complete search history.

(56) References Cited

U.S. PATENT DOCUMENTS

| | | | | |
|---|---|---|---|---|
| 11,029,972 B2 * | 6/2021 | Vichare | | G06F 11/3466 |
| 11,438,231 B2 * | 9/2022 | Gardner | | H04L 41/0846 |
| 11,455,195 B2 * | 9/2022 | Park | | G06F 9/5027 |
| 2009/0112780 A1 * | 4/2009 | Chen | | G06F 11/3409 |
| | | | | 706/19 |
| 2018/0314617 A1 * | 11/2018 | Khosrowpour | | G06F 11/3409 |
| 2021/0232425 A1 * | 7/2021 | Cox | | G06F 11/3017 |
| 2023/0359500 A1 * | 11/2023 | Li | | G06F 11/3024 |
| 2024/0302879 A1 * | 9/2024 | John | | G06F 1/26 |

* cited by examiner

*Primary Examiner* — Glenn A. Auve
(74) *Attorney, Agent, or Firm* — McDermott Will & Schulte LLP

(57) ABSTRACT

Embodiments may include a system and method for configuring operation of an information handling system based on a plurality of variants. Embodiments may determine the statistical operations for the variants, define priorities (for example less noise vs. better performance) and use iterative approximation of each variant in relation to all variants to select a profile and then configure operation of the information handling system based on the selected profile.

19 Claims, 10 Drawing Sheets

SYSTEM AND METHOD FOR DYNAMICALLY CONFIGURING AN INFORMATION HANDLING SYSTEM BASED ON A PROFILE

BACKGROUND

Field of the Disclosure

This disclosure relates generally to information handling systems and more particularly to systems and methods for configuring operation of an information handling system based on an profile.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments may be generally directed to a computer-implemented method performed by a processor in an information handling system for dynamically configuring operation of the information handling system. In some embodiments, the method comprises: storing, in a memory in the information handling system, a plurality of profiles associated with operation of the information handling system; detecting an application executing on the information handling system; gathering input data for each profile of the plurality of profiles, the input data comprising values corresponding to hardware executing the application to process a workload of information by the information handling system; identifying a plurality of variants; identifying a default profile from the plurality of profiles; determining a first variant from the plurality of variants; calculating a result for the first variant for each profile of the plurality of profiles based on the input data; identifying a set of candidate profiles from the plurality of profiles in which the result is better than a result for the default profile and determining an average result for each variant for the set of candidate profiles. The method further comprises iteratively performing: 1) selecting a subsequent variant from the plurality of variants based on the order of priority; 2) comparing a result for the subsequent variant for a candidate profile of the set of candidate profiles against the average result for the subsequent variant for the plurality of profiles; 3) if the result for the subsequent variant for the candidate profile is better than the average result for the subsequent variant for the plurality of profiles, adding the candidate profile to a wait list; 4) if the result for the subsequent variant for two or more candidate profiles of the set of candidate profiles cannot be distinguished, ranking the two or more candidate profiles; and 5) if the result for the subsequent variant for the candidate profile is worse than the average result for the subsequent variant for the plurality of profiles, performing steps 1-4 on the candidate profile in a subsequent stage. The method further comprises: in a last stage, ranking the set of candidate profiles; identifying a candidate profile with the highest rank based on one or more of the application executing on the information handling system, a phase of the application and the workload being processed by the application; and automatically configuring operation of the information handling system according to the identified candidate profile.

In some embodiments, the iterative steps are performed until all the candidate profiles in the set of candidate profiles are ranked. In some embodiments, the input data includes fan speed, power usage, measurement of performance and other hardware related data. In some embodiments, the set of candidate profiles are ranked based on a current variant, a previous variant until the first variant, and one or more subsequent variants in sequential order. In some embodiments, the set of candidate profiles are ranked from worst to best. In some embodiments, the default profile corresponds to one of an energy optimization profile, an acoustic energy minimization profile or a temperature optimization profile. In some embodiments, the plurality of profiles comprises at least one profile based on temperature of the information handling system, at least one profile based on performance of the information handling system and at least one profile based on power used by the information handling system.

In some embodiments, the plurality of variants comprises performance per watt (PPW), power improvement, fan improvement and performance improvement. In some embodiments, the first variant comprises performance per watt. In some embodiments, the order of priority for the plurality of variants is based on minimizing acoustic noise. In some embodiments, the first variant comprises fan speed.

Some embodiments may be generally directed to an information handling system comprising a processor and a memory storing a plurality of profiles associated with operation of the information handling system, a wait list and a set of instructions executable by the processor. The set of instructions may be executable to perform: detecting an application executing on the information handling system; retrieving input data for each profile of the plurality of profiles, the input data comprising values corresponding to hardware executing the application to process a workload of information by the information handling system; identifying a plurality of variants; identifying a default profile from the plurality of profiles; determining a first variant from the plurality of variants; calculating a result for the first variant for each profile of the plurality of profiles based on the input data; identifying a set of candidate profiles from the plurality of profiles in which the result is better than a result for the default profile and determining an average result for each variant for the set of candidate profiles. The set of instructions are further executable to iteratively perform: 1) selecting a subsequent variant from the plurality of variants based on the order of priority; 2) comparing a result for the subsequent variant for a candidate profile of the set of candidate profiles against the average result for the subsequent variant for the plurality of profiles; 3) if the result for the subsequent variant for the candidate profile is better than the average result for the subsequent variant for the plurality of profiles, adding the candidate profile to the wait list; 4) if the result for the subsequent variant for two or more candidate profiles of the set of candidate profiles cannot be distinguished, ranking the two or more candidate profiles; and 5) if the result for the subsequent variant for the candidate profile is worse than the average result for the subsequent variant for the plurality of profiles, performing steps 1-4 on the candidate profile in a subsequent stage. The set of instructions are further executable to perform: in a last stage, ranking the set of candidate profiles; identifying a candidate profile from the set of candidate profiles with the highest rank based on one or more of the application executing on the information handling system, a phase of the application and the workload being processed by the application; and automatically dynamically configuring operation of the information handling system according to the identified candidate profile.

In some embodiments, the input data includes fan speed, power usage, measurement of performance and other hardware related data. In some embodiments, the plurality of profiles comprises at least one profile based on temperature, at least one profile based on performance and at least one profile based on power. In some embodiments, the default profile corresponds to one of an energy optimization profile, an acoustic energy minimization profile or a temperature optimization profile. In some embodiments, the plurality of variants comprises performance per watt (PPW), power improvement, fan improvement and performance improvement. In some embodiments, the first variant comprises performance per watt. In some embodiments, the order of priority for the plurality of variants is based on minimizing acoustic noise. In some embodiments, the first variant comprises fan speed.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
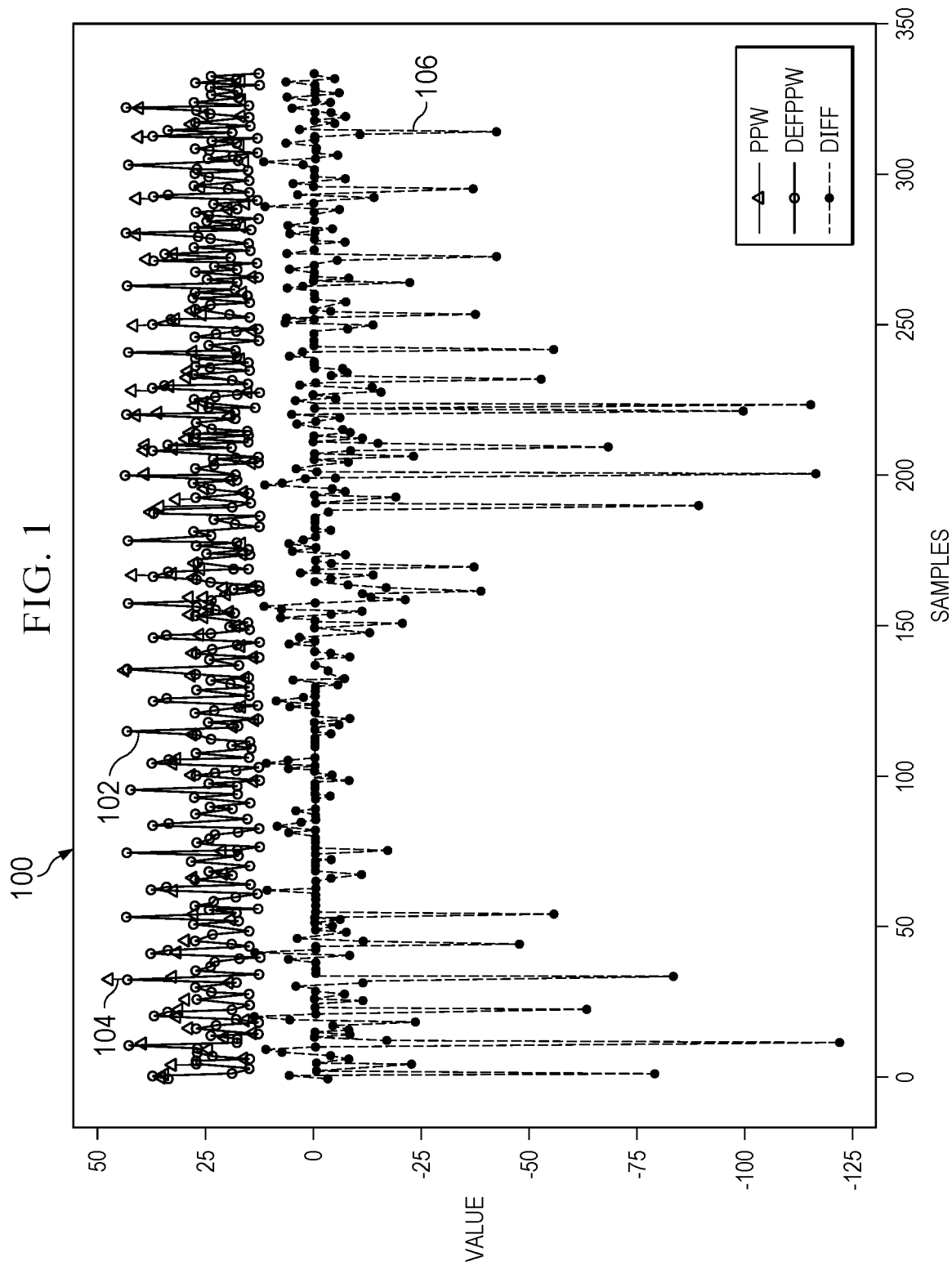
FIG. 1 depicts an example graph of scores for an information handling system processing an application with a workload, illustrating outcomes for multiple variants.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

An information handling system (IHS) may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, an IHS may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS may include or have a form factor of that of or similar to one or more of a laptop, a notebook, a telephone, a tablet, and a PDA, among others. For example, a portable IHS may be readily carried and/or transported by a user (e.g., a person). In one or more embodiments, components of an IHS may include one or more storage devices, one or more communications ports for communicating with external devices as well as various input and output (I/O) devices, such as a keyboard, a mouse, and a video display, among others. In one or more embodiments, IHS may include one or more buses operable to transmit communication between or among two or more hardware components. In one example, a bus of an IHS may include one or more of a memory bus, a peripheral bus, and a local bus, among others. In another example, a bus of an IHS may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I2C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, an IHS may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

An IHS may include a processor, a volatile memory medium, non-volatile memory media, an I/O subsystem, and a network interface. Volatile memory medium, non-volatile memory media, I/O subsystem, and network interface may be communicatively coupled to processor. In one or more embodiments, one or more of volatile memory medium, non-volatile memory media, I/O subsystem, and network interface may be communicatively coupled to processor via one or more buses, one or more switches, and/or one or more root complexes, among others. In one example, one or more of a volatile memory medium, non-volatile memory media, an I/O subsystem, and a network interface may be communicatively coupled to the processor via one or more PCI-Express (PCIe) root complexes. In another example, one or more of an I/O subsystem and a network interface may be communicatively coupled to processor via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

A volatile memory medium may include volatile storage such as, for example, RAM, DRAM (dynamic RAM), EDO RAM (extended data out RAM), SRAM (static RAM), etc. One or more of non-volatile memory media may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, a network interface may be utilized in communicating with one or more networks and/or one or more other information handling systems. In one example, network interface may enable an IHS to communicate via a network utilizing a suitable transmission protocol and/or standard. In a second example, a network interface may be coupled to a wired network. In a third example, a network interface may be coupled to an optical network. In another example, a network interface may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, a network interface may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, a processor may execute processor instructions in implementing at least a portion of one or more systems, at least a portion of one or more flowcharts, at least a portion of one or more methods, and/or at least a portion of one or more processes. In one example, a processor may execute processor instructions from one or more memory media in implementing at least a portion of one or more systems, at least a portion of one or more flowcharts, at least a portion of one or more methods, and/or at least a portion of one or more processes. In another example, a processor may execute processor instructions via a network interface in implementing at least a portion of one or more systems, at least a portion of one or more flowcharts, at least a portion of one or more methods, and/or at least a portion of one or more processes.

In one or more embodiments, a processor may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, a processor may interpret and/or execute program instructions and/or process data stored locally (e.g., via memory media and/or another component of an IHS). In another example, a processor may interpret and/or execute program instructions and/or process data stored remotely (e.g., via a network storage resource).

In one or more embodiments, an I/O subsystem may represent a variety of communication interfaces, graphics interfaces, video interfaces, user input interfaces, and/or peripheral interfaces, among others. For example, an I/O subsystem may include one or more of a touch panel and a display adapter, among others. For instance, a touch panel may include circuitry that enables touch functionality in conjunction with a display that is driven by a display adapter.

A non-volatile memory medium may include an operating system (OS) and applications (APPs). In one or more embodiments, one or more of an OS and APPs may include processor instructions executable by a processor. In one example, a processor may execute processor instructions of one or more of OS and APPs via a non-volatile memory medium. In another example, one or more portions of the processor instructions of one or more of an OS and APPs may be transferred to a volatile memory medium and a processor may execute the one or more portions of the processor instructions.

Non-volatile memory medium may include information handling system firmware (IHSFW). In one or more embodiments, IHSFW may include processor instructions executable by a processor. For example, IHSFW may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, a processor may execute processor instructions of IHSFW via non-volatile memory medium. In another instance, one or more portions of the processor instructions of IHSFW may be transferred to volatile memory medium, and processor may execute the one or more portions of the processor instructions of IHSFW via volatile memory medium.

Processing Varies by Information Handling Systems, Applications and Workloads

Different information handling systems may perform differently, may execute applications differently and may process workloads differently. For example, different hardware in different information handling systems may generate more or less heat and there are many applications that go through multiple workflows (e.g., recording, processing, playback) to create content. Information handling systems and applications have different performance expectations during these workflows. For example, a user such as a music creator may utilize a multimedia application (e.g., FL Studio) to record content, playback music, mix tracks and edit, or configure the application. The performance and level of acceptable acoustics are typically different for each phase. During recording, the user may want acoustic noise to be minimal to not interfere with the recording process, wherein higher temperatures and slower processing may be acceptable. During editing, the user may want high processing speed and be willing to sacrifice a quieter fan and allow for higher temperatures for the fastest processing. During playback, the user may allow the temperature of an information handling system to be elevated but below a threshold level for reduced fan noise and better processing.

Referring to FIG. 1, graph 100 depicts a time series of performance for different sample workloads, illustrating that one information handling system processing different workloads will have varying performance. Time series 104 may comprise values (e.g., performance per watt (PPW)) of an information handling system processing workloads according to a default profile (e.g., EPO3). Time series 106 may comprise values (e.g., PPW) of the information handling system processing the same workloads but according to a different profile (e.g., maximizing PPW). Time series 108 may comprise improvement values (e.g., percentage differences) between the same information handling system processing the same workloads at the different profiles. As depicted in FIG. 1, there are variations between the improvement values of the same information handling system processing different workloads, and the percentage difference between the same information handling system processing the same workload according to different profiles may vary greatly.

Figure 2:
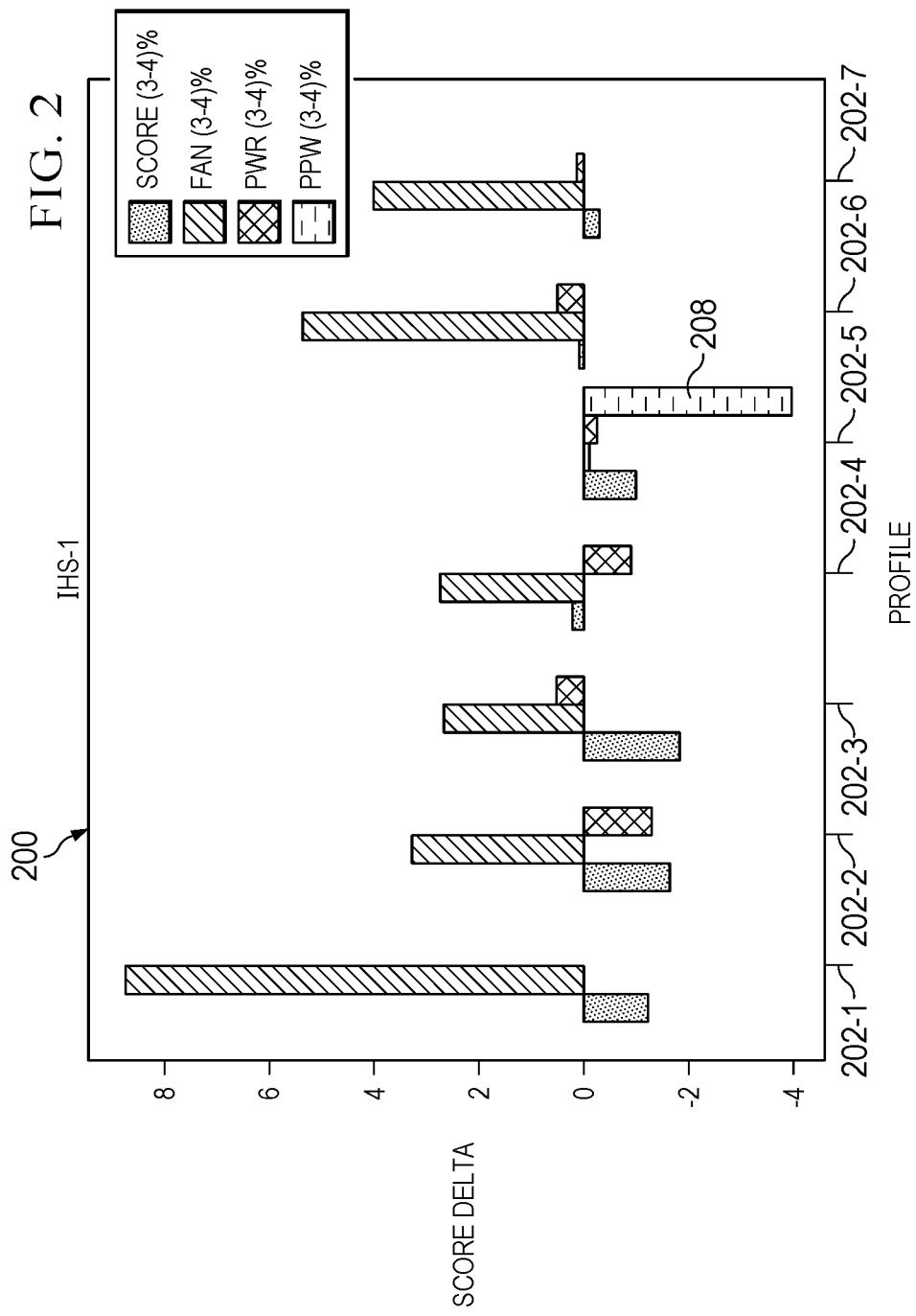
FIGS. 2 and 3 depict example graphs of two different information handling systems executing the same application to process the same workload, illustrating different possible outcomes for multiple variants.

Referring to FIG. 2, graph 200 depicts values for a first information handling system executing a first application (e.g., PCMark) and processing a workload according to different profiles 202, resulting in a range of varying improvements (e.g., percentage differences, which may also be called "deltas") between outcomes for the same parameters. For example, an information handling system operating according to profile 202-1 based on operation of a CPU with a first setting (e.g., profile 202-1 may be a default profile with a CPU operating at 60% maximum CPU speed) may result in a fan delta of approximately 8.5. In graph 200, a positive fan delta may indicate the fan speed is higher, which is not an improvement, and a negative fan delta may indicate the fan speed is lower, which is an improvement. Still referring to profile 202-1, information handling system may operate with a score delta (e.g., approximately −1.2), a power delta that is slightly negative (e.g., approximately −0.1) and a performance per watt (PPW) score of 0. A negative power delta may mean the information handling system is operating with less power which is an improvement and a PPW score of 0 may mean there is no significant change in PPW from the default profile.

The same information handling system operating according to a profile 202-2 based on the CPU operating at a second profile (e.g., profile 202-2 may be a default profile with a CPU operating at 70% maximum CPU speed) may result in a positive but lower fan delta (e.g., approximately 3.6), a larger score delta (e.g., approximately −1.8), a power delta that is negative (e.g., approximately −1.2) and a performance per watt (PPW) score that is also approximately 0. The same information handling system operating according to profile 202-5 (e.g., profile 202-5 may be based on temperature) may result in a negative fan delta (e.g., approximately −0.2), a negative score delta (e.g., approximately −0.8), a negative power delta (e.g., approximately −1.2) and a negative performance per watt (PPW) score (e.g., approximately −4).

Figure 3:
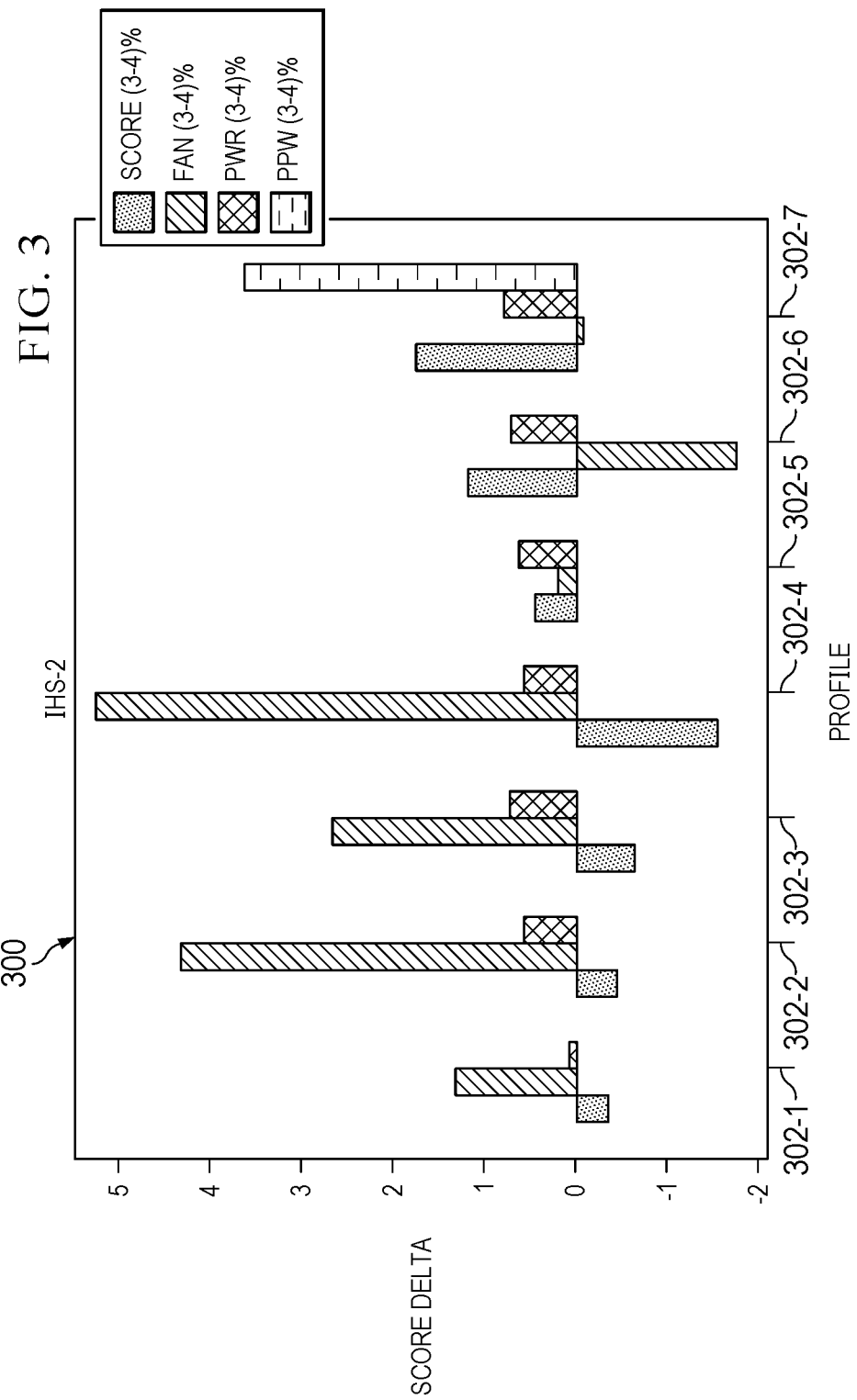

Referring to FIG. 3, graph 300 depicts values for a second information handling system executing a second application (e.g., Cinebench) and processing the same workloads but according to different profiles 302, resulting in a different range of deltas between outcomes for the same parameters. For example, an information handling system operating according to profile 302-1 (which may be the same as profile 202-1) may result in a positive fan delta (e.g., approximately 1.4), a negative score delta (e.g., approximately −0.4), a power delta that is slightly positive (e.g., approximately 0.1) and a performance per watt (PPW) score of 0. The same information handling system operating according to profile 302-2 (which may be the same as profile 202-2) may result in a higher fan delta (e.g., approximately 4.4), a negative score delta (e.g., approximately −0.5), a positive power delta (e.g., approximately 0.5) and a performance per watt (PPW) score of 0. The same information handling system operating according to profile 302-5 (which may be the same as profile 202-5) may result in a negative fan delta (e.g., approximately −0.2), a positive score delta (e.g., approximately 1.8), a positive power delta (e.g., approximately 0.7) and a positive performance per watt (PPW) score of approximately 3.8.

Figure 4:
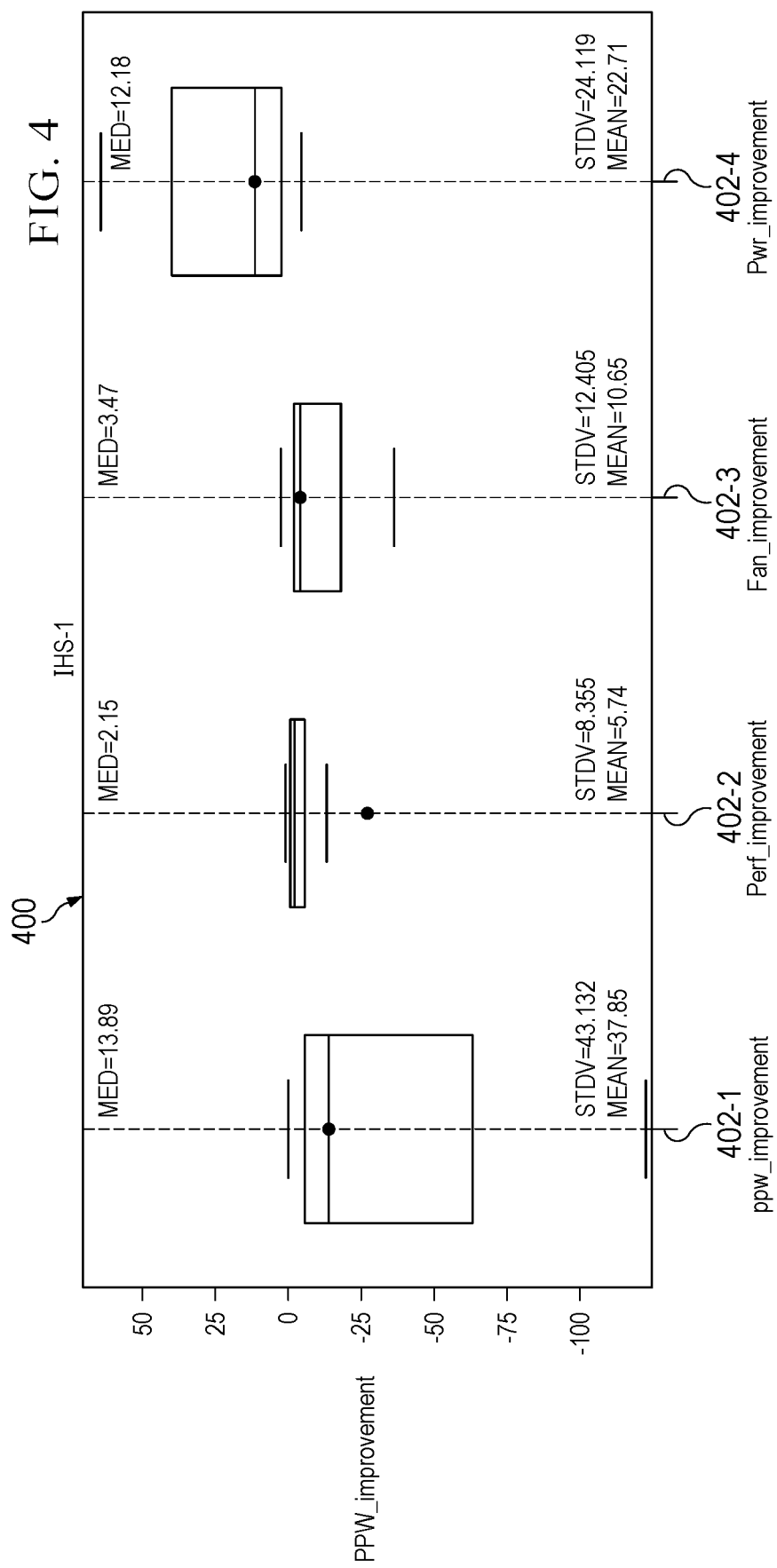
FIGS. 4 and 5 depict example charts depicting statistical distributions of variants for two different information handling systems executing the same application to process the same workload.
Figure 5:
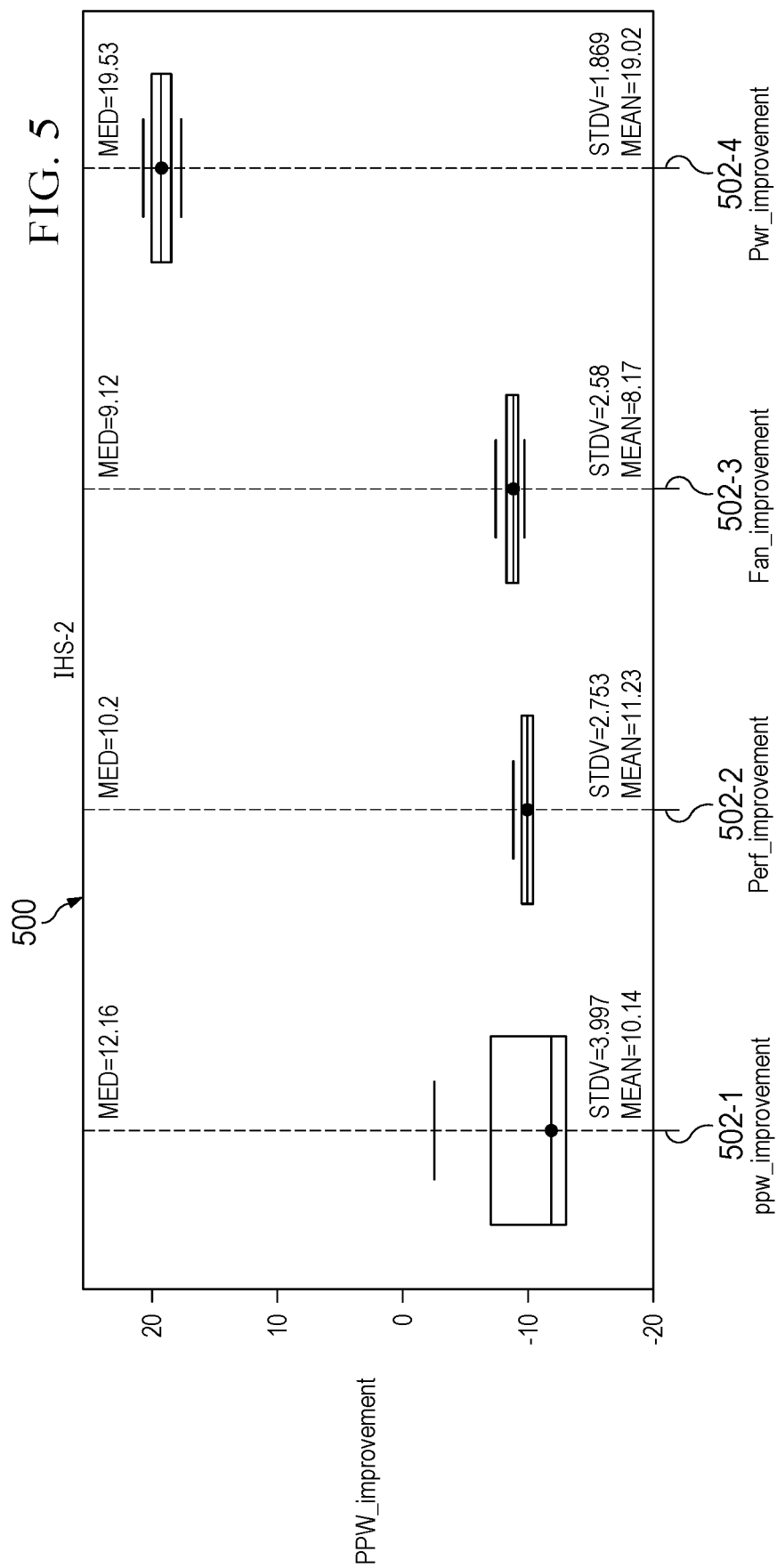

Referring to FIGS. 4 and 5, graph 400 depicts statistical distributions of improvements for selected parameters (e.g., performance per watt or PPW, performance improvement, fan improvement and power improvement) for a first information handling system (e.g., referring back to FIG. 2), and graph 500 depicts statistical distributions for selected parameters (e.g., performance per watt or PPW, performance improvement, fan improvement and power improvement) for a second information handling system (e.g., referring back to FIG. 3). Thus, an information handling system may execute the same application and process the same workload, but a distribution of outcomes for each parameter may vary based on different profile settings. Furthermore, different information handling systems may execute the same application and process the same workload, but the statistical distribution of outcomes for each parameter may vary based on different profile settings. Advantageously, the statistical distributions illustrated in FIGS. 4 and 5 may indicate potential gains for different profiles and variants for each parameter. However, the statistical distributions for parameters may vary non-linearly. For example, referring to FIG. 4, for all variations of operating an information handling system, the improvement of a first parameter (e.g., PPW) may have a mean of approximately 37.85 with a standard deviation of 43.12, whereas the improvement of a second parameter (e.g., performance) may have a mean of 5.74 with a standard deviation of 8.355. However, a single profile is unlikely to outperform all other possible profiles for all applications and workloads.

Information handling systems may typically operate under default profiles. EPO (Energy Performance Optimizer®) and Intel DTT are two examples of default profiles, wherein EPO3 and EPO4 both configure operation of an information handling system based on power and DTT may configure operation of an information handling system based on temperature.

Embodiments may start with a first variant (e.g., performance/watt efficiency) for comparison of a plurality of profiles to a default state. Within this range, embodiments only consider profiles with control combinations that have as good or higher characteristics. Through a unique, multi-pass and piecewise linear approximation method, embodiments may prioritize and sort all the variants which fall within a maxima or minima setting managed by each profile. Since Energy Performance Optimization (EPO) changes impact this result, this method also accounts and finds an optimal operating point for various EPO modes.

Figure 6:
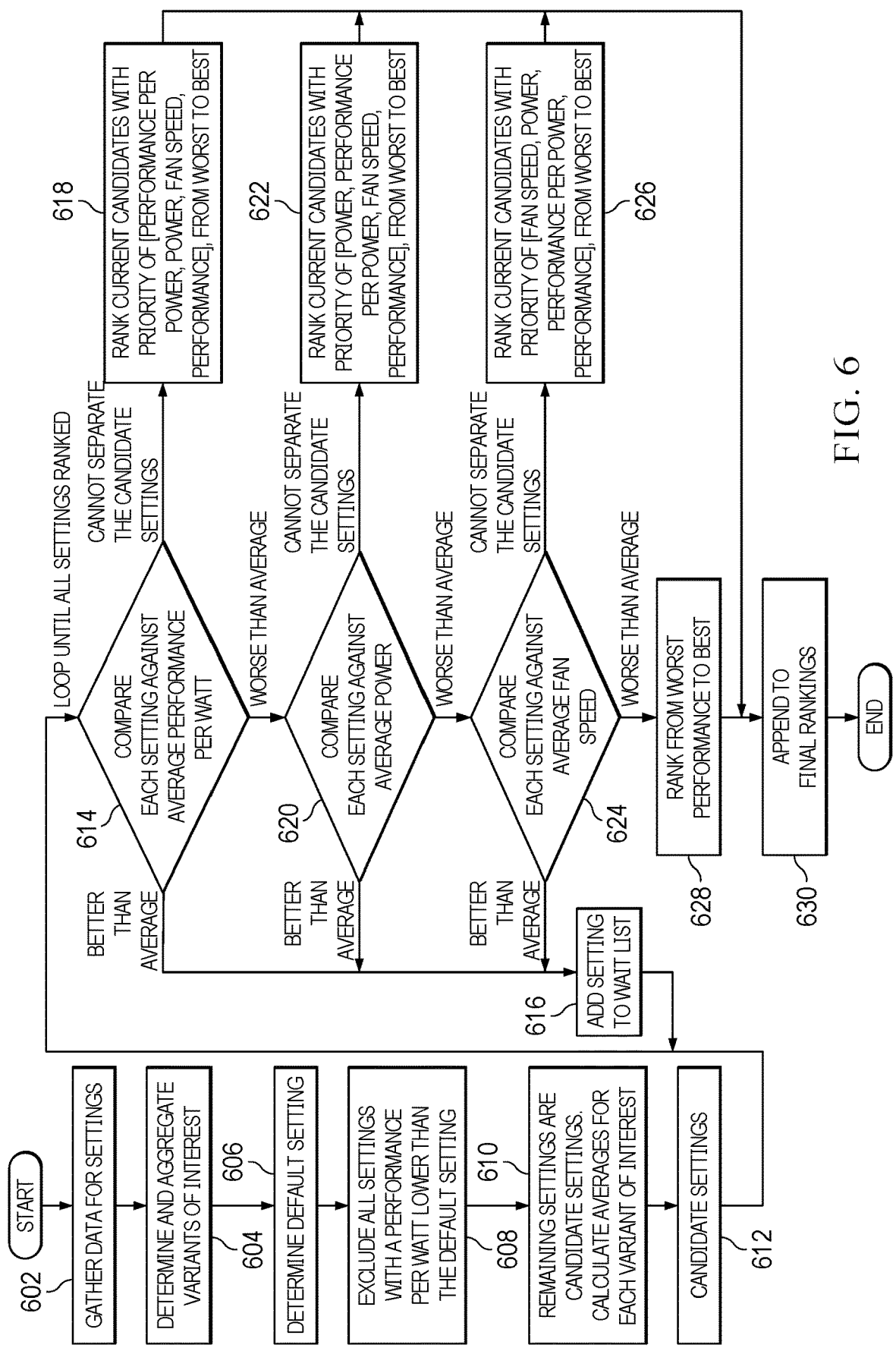
FIG. 6 depicts a flow diagram illustrating a method for configuring operation of an information handling system in accordance with some embodiments.

FIG. 6 depicts a flow diagram illustrating a method for determining a configuration for operation of an information handling system based on a plurality of variants. The method is described as it pertains to determining a configuration based on four variants of interest but may be based on fewer or more variants as well.

At step 602, embodiments may gather data for a plurality of profiles. Profiles may include, for example, a default profile (e.g., 3DEF corresponding to a default profile for EPO3, 4DEF corresponding to a default profile for EPO4), a default profile with a CPU operating at 60% (e.g., 3DEF-CPU60, 4DEF-CPU60), a default profile with a CPU operating at 70% (e.g., 3DEF-CPU70, 4DEF-CPU70), a default profile with a CPU operating at 80% (e.g., 3DEF-CPU8, 4DEF-CPU80), a default profile with a CPU operating at 90% (e.g., 3DEF-CPU90, 4DEF-CPU90), a thermal offset (TCC) profile (e.g., 3TCC-2 and 4TCC-2 correspond to a thermal offset of 2 degrees, 3TCC-5 and 4TCC-5 correspond to a thermal offset of 5 degrees, 3TCC-10 and 4TCC-10 correspond to a thermal offset of 10 degrees) 3USTT-QUIET, 4USTT-QUIET). Data may include, for example, fan speed, power usage, measurements of performance such as benchmark scores and other hardware-related data. In some embodiments, data may be retrieved from a database stored in memory in an information handling system, wherein the database may include data for a plurality of variants. In some embodiments, data may be preloaded in memory. In some embodiments, data may be uploaded from sensors in the information handling system during previous operating instances. In some embodiments, data may correspond to a workload.

An application executing on the information handling system may use various system resources, may involve audio and/or video inputs, may allow a user to collaborate with other information handling systems and may have two or more phases in which each phase has a different processing requirement. Digital Audio Workstation® is an example application that has multiple phases to allow a user to record and create music, wherein recording music may require lower acoustic noise and creating music may require advanced processing and/or collaboration.

At step 604, embodiments may determine and aggregate a set of variants of interest. For example, embodiments may determine there are four variants of interest including performance per watt (PPW), power improvement, fan performance and performance improvement (e.g., score). In some embodiments, an information handling system may determine an order of priority. For example, in some embodiments, an information handling system may determine that an application relates to recording, determine that reducing acoustic noise from a fan may be important and may determine fan speed is the first priority variant, followed by performance per watt, power and performance. In some embodiments, a user may designate an order of priority for a plurality of variants of interest.

At step 606, embodiments may determine a default profile. A default profile may refer to a profile in which no optimizations are applied to any variant. For example, embodiments may determine a default profile for an information handling system (e.g., 3DEF corresponding to a default profile associated with EPO3).

At step 608, embodiments may identify a plurality of profiles and exclude any profiles associated with unacceptable outcomes based on the first priority variant. For example, if the first priority variant is PPW, embodiments may identify a plurality of profiles and exclude any profile in which the outcome for PPW is worse (e.g., lower) than the outcome for the default profile.

Figure 7:
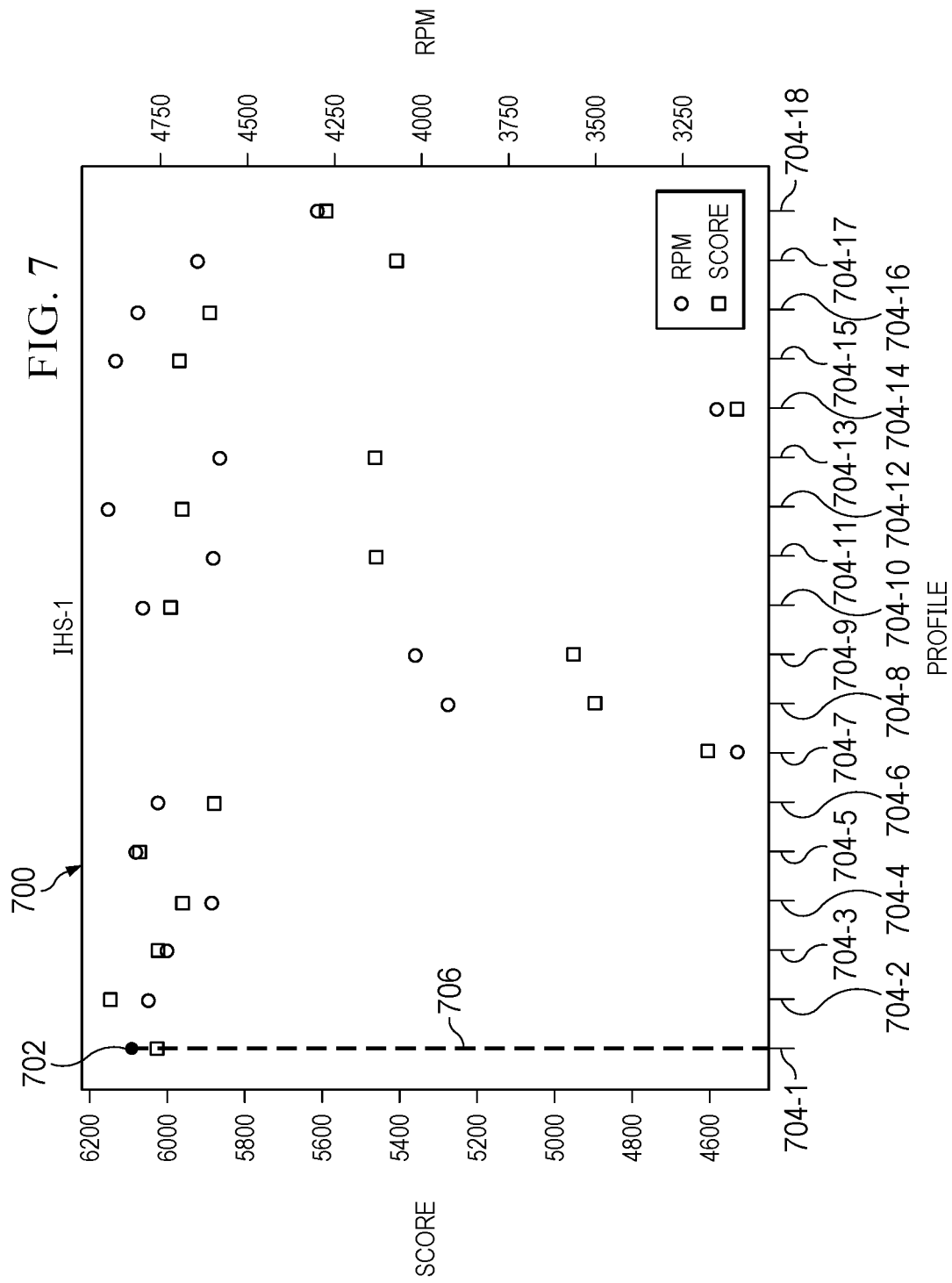
FIG. 7 depicts an example graph of scores for variants of an information handling system processing an application with a workload, illustrating outcomes for multiple profiles in which all outcomes are better than a default profile.
Figure 8:
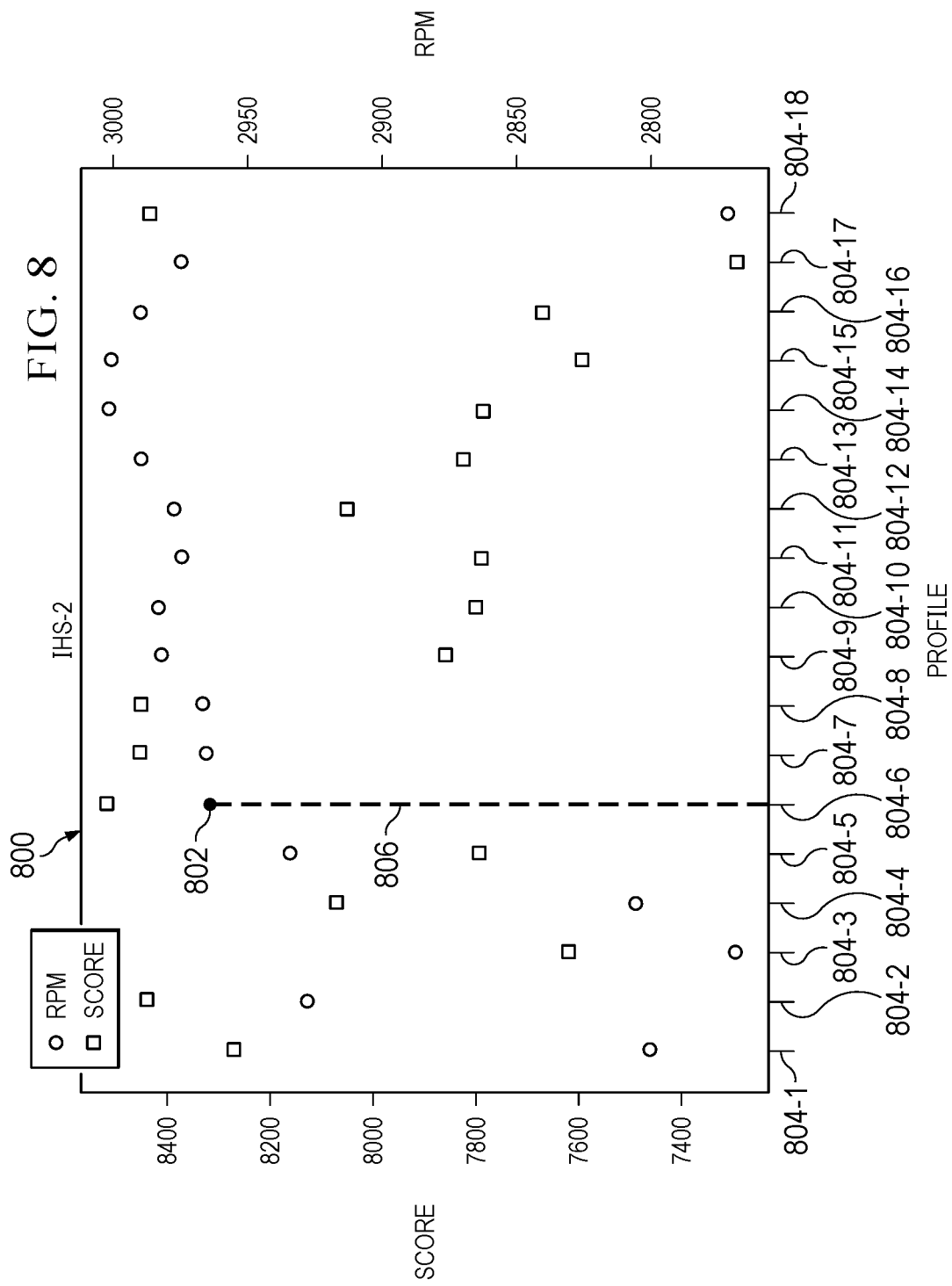
FIG. 8 depicts an example graph of scores for variants of an information handling system processing an application with a workload, illustrating outcomes for multiple profiles in which some profiles are better than a default profile.

Referring to FIG. 7, profiles 704 refer to a plurality of possible configurations of an information handling system processing a workload, wherein point 702 refers to an outcome for profile 704-1 corresponding to a default profile (e.g., 3DEF). In this case, all profiles (e.g., profiles 704-2 to 704-18 to the right of point 702) have better outcomes and may be referred to as candidate profiles. Referring to FIG. 8, profiles 804 refer to a plurality of possible configurations of a different information handling system processing a workload, wherein point 802 refers to an outcome for profile 804-6 corresponding to a default profile (e.g., 3DEF associated with energy performance optimization). In this case, some profiles (e.g., profiles 804-1 to 804-5 to the left of point 802) are associated with unacceptable outcomes and some profiles (e.g., profiles 804-7 to 804-18 to the right of point 802) are associated with acceptable outcomes and may be referred to as candidate profiles.

Referring back to FIG. 6, once any unacceptable profiles are eliminated based on the first priority variant, embodiments may iteratively analyze the remaining candidate profiles to identify the least optimal profiles.

At step 610, embodiments may determine an average result for each variant of interest based on all the candidate profiles. For example, referring to FIG. 7, embodiments may identify a set of candidate profiles 704 (e.g., candidate profiles 704-1 to 704-18), wherein the sum of all results associated with a variant may be divided by the number of candidate profiles (e.g., 17) to get an average result for the set of candidate profiles 704.

CHART 1

| PROFILE | SETTING | % FAN | % SCORE | % PPW | % POWER |
|---|---|---|---|---|---|
| 704-1 | 3DEF | 0.0 | 0.0 | 0.0 | 0.0 |
| 704-2 | 4DEF | 2.72 | 0.7 | 0.0 | 0.1 |
| 704-3 | 4TCC-2 | −0.25 | −1.46 | 5.56 | 4.0 |
| 704-4 | 4TCC-5 | −1.68 | −3.38 | 5.56 | 7.68 |
| 704-5 | 4TCC-10 | 0.96 | −0.2 | 5.56 | 3.09 |
| 704-6 | 3TCC-5 | −3.52 | −1.1 | 0.0 | 1.52 |
| 704-7 | 4DEFCPU60 | 33.24 | −25.60 | 116.67 | 4.2 |
| 704-8 | 3DEFCPU70 | −26.51 | −13.33 | 83.33 | 52.42 |
| 704-9 | 4DEFCPU70 | −25.17 | −12.04 | 100.0 | 54.86 |
| 704-10 | 3TCC-10 | −0.96 | −0.14 | 0.0 | −3.4 |
| 704-11 | 3USTT-QUIET | −13.26 | −3.49 | 11.11 | 10.1 |
| 704-12 | 3TCC-2 | −1.57 | 0.94 | 5.56 | 0.04 |
| 704-13 | 4DEFCPU80 | −13.26 | −3.75 | 55.56 | 31.98 |
| 704-14 | 3DEFCPU60 | −35.12 | −35.12 | 122.22 | 65.15 |
| 704-15 | 4DEFCPU90 | −1.68 | 0.62 | 22.22 | 14.15 |
| 704-16 | 3DEFCPU90 | −3.42 | −0.32 | 16.67 | 14.36 |
| 704-17 | 3DEFCPU80 | −14.52 | −2.84 | 55.56 | 35.87 |
| 704-18 | 4USTT-QUIET | −10.25 | −7.84 | 5.56 | 10.03 |
| | AVERAGE | −6.72 | −6.37 | 35.95 | 18.00 |

Referring to FIG. 8, if embodiments determine outcomes for some profiles 804 are unacceptable, embodiments may eliminate those profiles (e.g., profiles 804-1 to 804-5) and identify 12 candidate profiles (e.g., profiles 804-6 through 804-18) for a different information handling system using an application to process the same workload. The sum of all results associated with a variant may be divided by 12 to get an average result for the variant for the set of candidate profiles.

CHART 2

| PROFILE NUMBER | PROFILE NAME | % FAN | % SCORE | % PPW | % POWER |
|---|---|---|---|---|---|
| 804-6 | 3DEF | 0.0 | 0.0 | 0.0 | 0.0 |
| 804-7 | 3DEFCPU90 | −0.4 | 0.04 | 0.0 | 0.32 |
| 804-8 | 3DEFCPU80 | −0.4 | 0.12 | 0.0 | 0.36 |
| 804-9 | 4TCC-2 | −4.17 | 1.09 | 0.0 | 0.93 |
| 804-10 | 4TCC-10 | −4.53 | 1.18 | 0.0 | 0.99 |
| 804-11 | 4TCC-5 | −4.6 | 0.62 | 0.0 | 1.06 |
| 804-12 | 4DEFCPU80 | −2.97 | 0.79 | 0.0 | 1.06 |
| 804-13 | 3TCC-10 | −4.37 | 1.6 | 0.0 | 0.33 |
| 804-14 | 3TCC-5 | −4.67 | 2.35 | 3.7 | 0.32 |
| 804-15 | 3TCC-2 | −5.87 | 2.27 | 0.0 | 0.26 |
| 804-16 | 4DEFCPU90 | −5.37 | 1.62 | 0.0 | 0.87 |
| 804-17 | 4DEF | −7.8 | 0.69 | 0.0 | 0.92 |
| 804-18 | 4USTT-QUIET | 0.53 | −12. | 11.11 | 1.96 |
| | AVERAGE | −3.72 | 0.03 | 1.23 | 0.78 |

Identifying Least Optimal Profiles
First Stage

At step 614, embodiments may compare the results for a variant for each candidate profile in the set of candidate profiles against an average result for the variant for all the candidate profiles. For example, if PPW is the first priority variant being considered, embodiments may compare a PPW result for each candidate profile against the average PPW result for all the candidate profiles.

At step 616, in some embodiments, if a result for a candidate profile for the first priority variant is better than the average result for all the candidate profiles, the candidate profile may be added to a wait list. For example, if PPW is the first priority variant, the PPW result of each candidate profile is compared against the average PPW calculated in step 610. At step 616, all candidate profiles with better PPW results are stored in the wait list.

If a result for a candidate profile for the first priority variant is worse than the average result for all the candidate profiles, the candidate profile may be further evaluated in subsequent stages. All profiles in the set of profiles may be evaluated against the current variant of interest before proceeding to a subsequent stage.

Subsequent (Second) Stage

At step 620, all candidate profiles having a result for a candidate profile for a previous (e.g., first) priority variant that is worse than the average result for all the candidate profiles may be evaluated against a subsequent (e.g., second) variant of interest. If a result for a candidate profile for a subsequent (e.g., second) priority variant is better than the average result for all the candidate profiles, the candidate profile is added to the wait list. For example, if power is the subsequent (e.g., second) priority variant in the order of priority, a power result of each candidate profile in the wait list may be compared against the average power improvement calculated in step 610. At step 616, all profiles with better power improvement results are added to the wait list.

If a result for a candidate profile for the subsequent (e.g., second) priority variant is worse than the average result for all the candidate profiles, the candidate profile may be further evaluated in subsequent stages. All profiles in the set of profiles may be evaluated before proceeding to a subsequent (e.g., third) stage.

Subsequent (Third) Stage

At step 624, all candidate profiles having a result for the second priority variant that is worse than the average result for all the candidate profiles may be evaluated against a subsequent (e.g., third) priority variant. If a result for a candidate profile for a subsequent (e.g., third) priority variant is better than the average result for all the candidate profiles, the candidate profile is added to the wait list. For example, if fan speed is the subsequent (e.g., third) priority variant in the order of priority, a fan speed result of each candidate profile may be compared against the average fan speed calculated in step 610. At step 616, all profiles with better fan speed results are added to the wait list. All candidate profiles may be evaluated before proceeding to a subsequent (e.g., fourth) stage.

Candidate Profiles May be Indistinguishable for Some Variants

Referring to steps 618, 622 and 624, in some embodiments, if two or more candidate profiles cannot be distinguished from other candidate profiles based on a variant, the two or more candidate profiles may be ranked based on the priority of the variants. In some embodiments, the two or more candidate profiles may be ranked based on an order of priority of the variants. In some embodiments, the two or more candidate profiles may be ranked based on the following priority of the variants: 1) the current variant; 2) each previous variant until the first variant; and 3) all other variants in sequential order.

For example, referring to step 618, if the order of priority is PPW, power, fan speed and performance and two or more candidate profiles cannot be distinguished from other candidate profiles based on the first priority variant (e.g., PPW), the two or more candidate profiles may be ranked from worst to best based on the following order: PPW, power, fan speed and performance.

Referring to step 622, if the order of priority is PPW, power, fan speed and performance and two or more candidate profiles cannot be distinguished from other candidate profiles based on the second priority variant (e.g., power), the two or more candidate profiles may be ranked from worst to best based on the following order: power, PPW, fan speed and performance.

Referring to step 626, if the order of priority is PPW, power, fan speed and performance and two or more candidate profiles cannot be distinguished from other candidate profiles based on the third priority variant (e.g., fan speed), the two or more candidate profiles may be ranked from worst to best based on the following order: fan speed, power, PPW and performance.

Steps 614, 616, 618, 620, 622, 624, and 626 may be repeated as needed until all candidate profiles are ranked the last variant.

Last Stage

At step 628, for the last stage, all candidate profiles having a result for a candidate profile for the previous priority variant that is worse than the average result for all the candidate profiles may be ranked from worst to best according to an order of priority of the variants.

Once embodiments have ranked the candidate profiles for all variants, embodiments may automatically and dynamically determine a candidate profile is the best for configuring operation of the information handling system based on one or more of the application executing on the information handling system, a phase of the application and the workload being processed by the application, and a candidate profile with the highest rank and configure operation of the information handling system.

Figure 9:
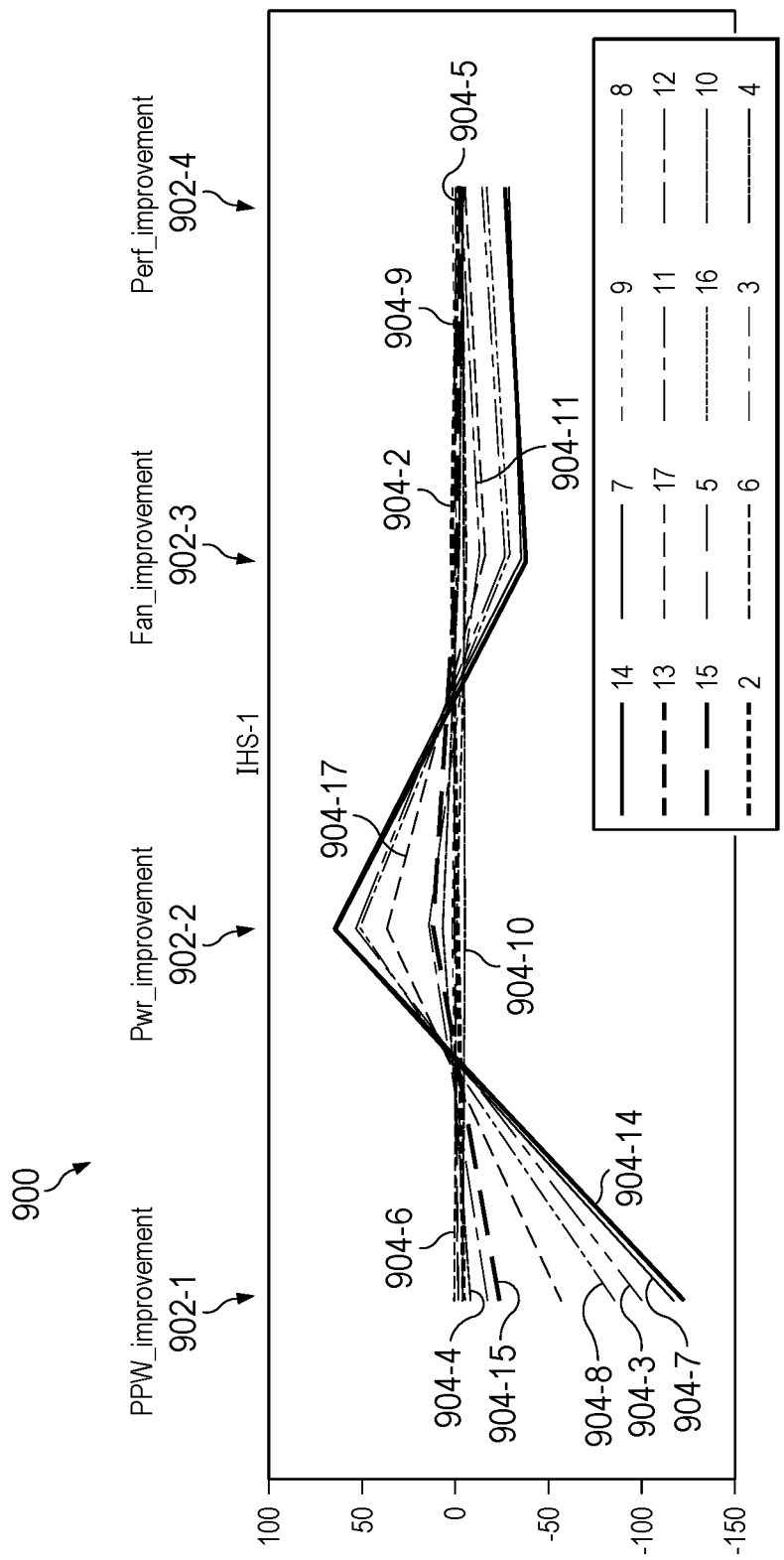
FIG. 9 depicts an example chart of results for all acceptable profiles of a first information handling system processing a workload based on multiple variants.
Figure 10:
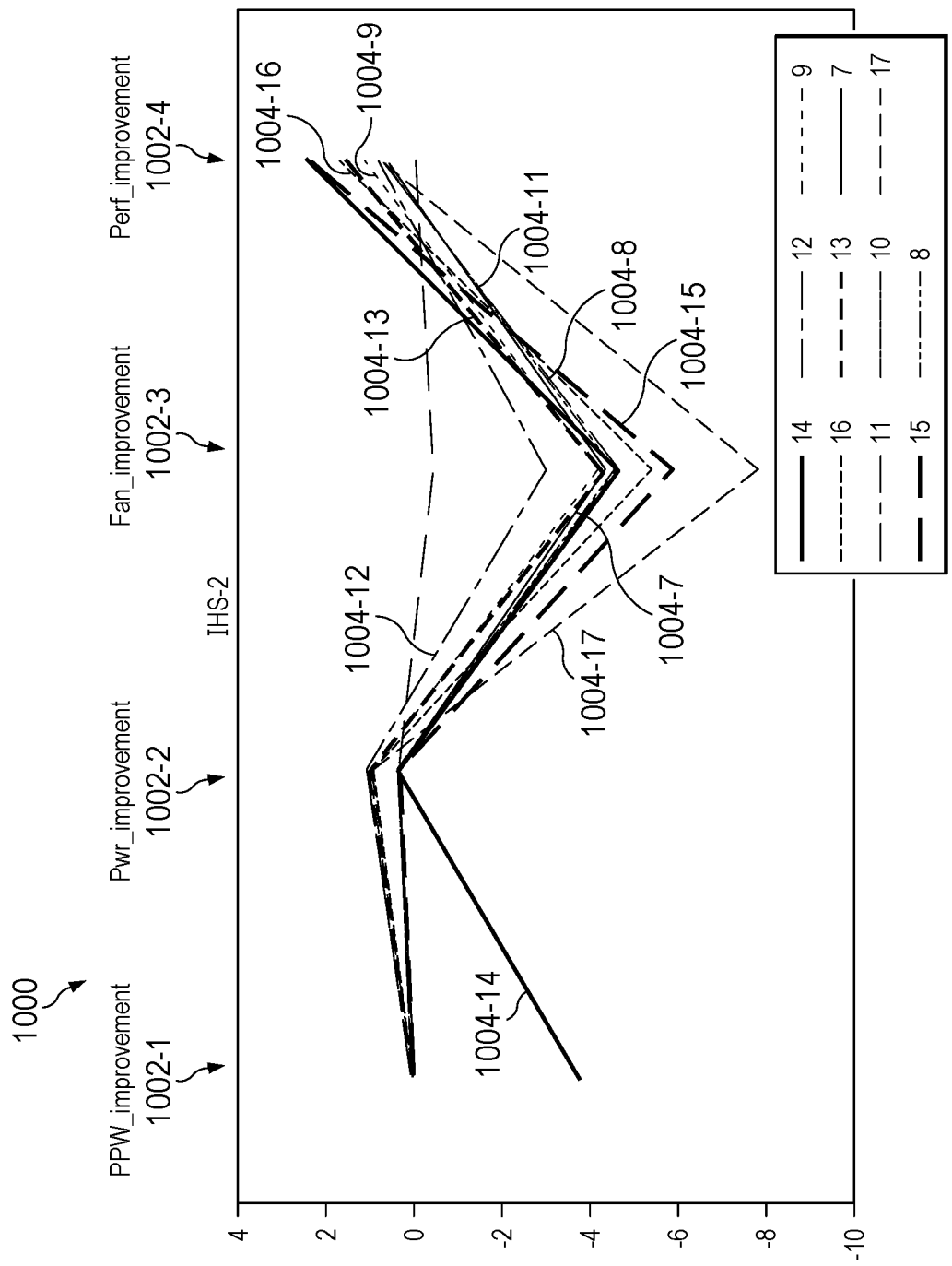
FIG. 10 depicts an example chart of results for all acceptable profiles of a second information handling system processing the workload based on multiple variants.

FIGS. 9 and 10 depict linear approximations of the results of two different information handling system executing different applications to process a workload according to the different candidate profiles described above. FIGS. 9 and 10 may correspond to the same variants of interest and the same order of priority but illustrate differences. As depicted in FIGS. 9 and 10, a negative value may indicate an improvement and a positive score may indicate a less desirable result.

Noting that the primary variant is PPW, the PPW improvement result for each candidate profile in both FIGS. 9 and 10 is the same or better than the default profile. Thus, each candidate profile may be acceptable in terms of PPW.

Referring to FIG. 9, each line 904 illustrates candidate profiles may be more distinguishable from other candidate profiles for some variants (e.g., PPW, power and fan speed) but hard to distinguish for other variants (e.g., performance). Regarding a second priority variant (e.g., power), some candidate profiles may result in substantially no improvement over the default profile and some candidate profiles may result in worse power usage by the information handling system. Regarding a third priority variant (e.g., fan speed), almost all candidate profiles may result in some improvement over the default profile and some candidate profiles may result in even better fan speed by the information handling system. Regarding a fourth priority variant (e.g., performance), almost all candidate profiles may result in some improvement over the default profile. Each line 904 may show a relationship between the four variants. For example, line 904-14 may indicate that an information handling system operating in accordance with profile 704-14 in Chart 1 may operate with one of the best PPW results and one of the better fan speed improvements, but with a higher (e.g., worse) power improvement score.

Referring to FIG. 10, each line 1004 illustrates candidate profiles may be more distinguishable from other candidate profiles for some variants (e.g., PPW, fan speed and performance) but hard to distinguish for other variants (e.g., power). Regarding a second priority variant (e.g., power), some candidate profiles may result in substantially no improvement (or possibly worse results) over the default profile. Regarding a third priority variant (e.g., fan speed), all candidate profiles may result in improvement over the default profile and some candidate profiles may result in significant fan speed improvement by the information handling system. Regarding a fourth priority variant (e.g., performance), almost all candidate profiles may result in worse performance over the default profile. Each line 1004 may show a relationship between the four variants. For example, line 1004-14 may indicate that an information handling system operating in accordance with profile 804-14 in Chart 2 may result in one of the best PPW results and may result in a fan speed improvement, but may result in a higher (e.g., worse) performance improvement score. Line 1004-17 may indicate that an information handling system operating in accordance with profile 804-17 in Chart 2 may result in a PPW result that is not significantly better than the default profile and may have a decreased performance score but may result in the best fan speed improvements, which may be better for applications requiring low acoustic noise. In this case, a default setting (e.g., 4DEF corresponding to energy performance optimization) would be the best profile to operate the information handling system based on fan speed improvement as well as having a better PPW result and based on power and performance.

Once the candidate profiles are ranked, embodiments may identify a candidate profile with the highest rank and dynamically configure operation of an information handling system according to the selected candidate profile. For example, if low acoustic noise is the priority variant, instead of adjusting a single parameter (e.g., fan speed), which may lead to a poor overall user experience, embodiments may select a profile (e.g., 4DEF) to configure the information handling system to process information using an application or a phase in the application. Furthermore, embodiments may select and implement a profile automatically and dynamically. Thus, if the same information handling system switches to a new phase in which higher processing is needed, embodiments do not simply increase the fan speed but instead may determine a second profile is better and automatically and dynamically configure operation of the information handling system accordingly.

Thus, referring to the use case above, if a user is using an information handling system to record music, embodiments may determine the information handling system is executing an application or processing information associated with recording and automatically configure the information handling system to operate according to a first profile (e.g., profile 804-14 associated with a temperature control profile). Furthermore, if the information handling system determines the workload has switched to a processing operation, embodiments may automatically and dynamically switch operation to a second profile (e.g., profile 804-17 associated with a default profile associated with energy optimization) for improved processing, wherein both the first selected profile and the second selected profile may have a better PPW result than a default profile but operation of the information handling system according to each selected profile results in a better user experience and without any input from the user.

Advantageously, embodiments may work well with all types of information handling systems, applications and workloads. Information handling systems may vary in hardware, which may include variations due to different vendors, replacement hardware and the like. Applications may vary in the number of phases, what processing occurs in each phase and what hardware is needed to process information in each phase, and different information handling systems may execute different versions of the same application. Workloads may vary in the type of information being processed and how the information is to be processed. Instead of optimizing operation of all information handling systems, embodiments may automatically and dynamically configure operation of a particular information handling system according to a profile that embodiments selected based on the particular hardware, the particular application (including a particular version or a particular phase) and a particular workload.

Use Cases:

Studio Optimizer and DAW—A music creator may use an application to record content, playback music, mix tracks and edit, or configure the application. The performance and level of acceptable acoustics are different for each phase. Embodiments may automatically and dynamically configure the information handling system to operate in a first profile (that still has a better PPW than a default profile and with better (e.g., lower) acoustics but with worse performance) during recording, but may automatically and dynamically switch operation to a second profile (that still has a better PPW and with better performance (but with louder acoustics) during processing.

Collaboration Mode—A user is using an information handling system for productivity work. Embodiments may determine the application requires bursts of performance and automatically and dynamically select a first profile to provide the additional responsiveness needed. For example, the information handling system may be configured to operate in a first profile associated with USTT mode with an "Optimize" setting. After a while, the user joins a video call with screen sharing. Embodiments may detect the change in workload and automatically and dynamically switch operation of the information handling system to a second profile associated with a Collaboration Mode with different settings or configuring the information handling system to a third profile associated with a Quiet Mode by reducing power and lowering acoustics.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method performed by a processor in an information handling system for dynamically configuring operation of the information handling system, the method comprising:

storing, in a memory in the information handling system, a plurality of profiles associated with operation of the information handling system;
detecting an application executing on the information handling system;
gathering input data for each profile of the plurality of profiles, the input data comprising values corresponding to hardware executing the application to process a workload of information by the information handling system;
identifying a plurality of variants;
identifying a default profile from the plurality of profiles;
determining a first variant from the plurality of variants;
calculating a result for the first variant for each profile of the plurality of profiles based on the input data;
identifying a set of candidate profiles from the plurality of profiles in which the result is better than a result for the default profile;
determining an average result for each variant for the set of candidate profiles;
iteratively performing:
  1) Selecting a subsequent variant from the plurality of variants based on an order of priority;
  2) Comparing a result for the subsequent variant for a candidate profile of the set of candidate profiles against the average result for the subsequent variant for the plurality of profiles;
  3) If the result for the subsequent variant for the candidate profile is better than the average result for the subsequent variant for the plurality of profiles, adding the candidate profile to a wait list;
  4) If the result for the subsequent variant for two or more candidate profiles of the set of candidate profiles cannot be distinguished, ranking the two or more candidate profiles; and
  5) If the result for the subsequent variant for the candidate profile is worse than the average result for the subsequent variant for the plurality of profiles, performing steps 1-4 on the candidate profile in a subsequent stage;
in a last stage, ranking the set of candidate profiles;
identifying a candidate profile with the highest rank based on one or more of the application executing on the information handling system, a phase of the application and the workload being processed by the application; and
automatically configuring operation of the information handling system according to the identified candidate profile.

2. The method of claim 1, wherein the iterative steps are performed until all the candidate profiles in the set of candidate profiles are ranked.

3. The method of claim 1, wherein the input data includes fan speed, power usage, measurement of performance and other hardware related data.

4. The method of claim 1, wherein the set of candidate profiles are ranked based on a current variant, a previous variant until the first variant, and one or more subsequent variants in sequential order.

5. The method of claim 4, wherein the set of candidate profiles are ranked from worst to best.

6. The method of claim 1, wherein the default profile corresponds to one of an energy optimization profile, an acoustic energy minimization profile or a temperature optimization profile.

7. The method of claim 1, wherein the plurality of profiles comprises at least one profile based on temperature of the information handling system, at least one profile based on performance of the information handling system and at least one profile based on power used by the information handling system.

8. The method of claim 1, wherein the plurality of variants comprises performance per watt (PPW), power improvement, fan improvement and performance improvement.

9. The method of claim 8, wherein the first variant comprises performance per watt.

10. The method of claim 8, wherein the order of priority for the plurality of variants is based on minimizing acoustic noise.

11. The method of claim 10, wherein the first variant comprises fan speed.

12. An information handling system comprising:
a processor; and
a memory storing:
a plurality of profiles associated with operation of the information handling system;
a wait list; and
a set of instructions executable by the processor to perform:
detecting an application executing on the information handling system;
retrieving input data for each profile of the plurality of profiles, the input data comprising values corresponding to hardware executing the application to process a workload of information by the information handling system;
identifying a plurality of variants;
identifying a default profile from the plurality of profiles;
determining a first variant from the plurality of variants;
calculating a result for the first variant for each profile of the plurality of profiles based on the input data;
identifying a set of candidate profiles from the plurality of profiles in which the result is better than a result for the default profile;
determining an average result for each variant for the set of candidate profiles;
iteratively performing:
1) Selecting a subsequent variant from the plurality of variants based on an order of priority;
2) Comparing a result for the subsequent variant for a candidate profile of the set of candidate profiles against the average result for the subsequent variant for the plurality of profiles;
3) If the result for the subsequent variant for the candidate profile is better than the average result for the subsequent variant for the plurality of profiles, adding the candidate profile to the wait list;
4) If the result for the subsequent variant for two or more candidate profiles of the set of candidate profiles cannot be distinguished, ranking the two or more candidate profiles; and
5) If the result for the subsequent variant for the candidate profile is worse than the average result for the subsequent variant for the plurality of profiles, performing steps 1-4 on the candidate profile in a subsequent stage; and
in a last stage, ranking the set of candidate profiles;
identifying a candidate profile from the set of candidate profiles with the highest rank based on one or more of the application executing on the information handling system, a phase of the application and the workload being processed by the application; and
automatically dynamically configuring operation of the information handling system according to the identified candidate profile.

13. The information handling system of claim 12, wherein the input data includes fan speed, power usage, measurement of performance and other hardware related data.

14. The information handling system of claim 12, wherein the plurality of profiles comprises at least one profile based on temperature, at least one profile based on performance and at least one profile based on power.

15. The information handling system of claim 12, wherein the default profile corresponds to one of an energy optimization profile, an acoustic energy minimization profile or a temperature optimization profile.

16. The information handling system of claim 12, wherein the plurality of variants comprises performance per watt (PPW), power improvement, fan improvement and performance improvement.

17. The information handling system of claim 16, wherein the first variant comprises performance per watt.

18. The information handling system of claim 16, wherein the order of priority for the plurality of variants is based on minimizing acoustic noise.

19. The information handling system of claim 18, wherein the first variant comprises fan speed.

* * * * *